United States Patent [19]

Dimitracopoulos

[11] 3,730,618
[45] May 1, 1973

[54] AUDIO AND AUDIOVISUAL APPARATUS WITH PINCERS-LIKE ROTATING ARM

[76] Inventor: Panayotis C. Dimitracopoulos, P. O. Box 458, Outremont, Montreal, Quebec, Canada

[22] Filed: Mar. 2, 1970

[21] Appl. No.: 15,739

[52] U.S. Cl. .................. 353/19, 274/9 C, 274/13 A
[51] Int. Cl. .................. G11b 17/06, G03b 31/06
[58] Field of Search.................. 353/19; 274/13 A

[56] References Cited

UNITED STATES PATENTS

| | | | |
|---|---|---|---|
| 3,389,636 | 6/1968 | Weitzner et al. | 353/19 |
| 3,480,356 | 11/1969 | Dimitracopoulos | 353/19 |
| 2,537,657 | 1/1951 | D'Humy et al. | 274/13 A |
| 2,005,588 | 6/1935 | Mallina | 274/13 A |
| 1,522,547 | 1/1925 | Roehrig | 274/13 A |
| 2,535,495 | 12/1950 | James | 274/13 A |

FOREIGN PATENTS OR APPLICATIONS

| | | | |
|---|---|---|---|
| 709,022 | 5/1954 | Great Britain | 274/4 H |
| 1,547,128 | 11/1969 | Germany | 353/19 |

*Primary Examiner*—Louis R. Prince
*Assistant Examiner*—Steven L. Stephan

[57] ABSTRACT

An audio apparatus comprising a rotating information-scanning arm, having the general shape of a two-pronged yoke, which straddles and grips, in pincers-like fashion, both sides of a sound and information record, one of its gripping elements including a sound and signal reading transducer. An audiovisual embodiment of the above being an apparatus for the simultaneous, synchronized, optical projection of an image and the reproduction of its associated sound from audiovisual slides and audiovisual data-record cards having a projectable image surrounded by a spiral information track, in which case, the transducer-carrying two-pronged yoke, rotates around the optical projection beam.

26 Claims, 14 Drawing Figures

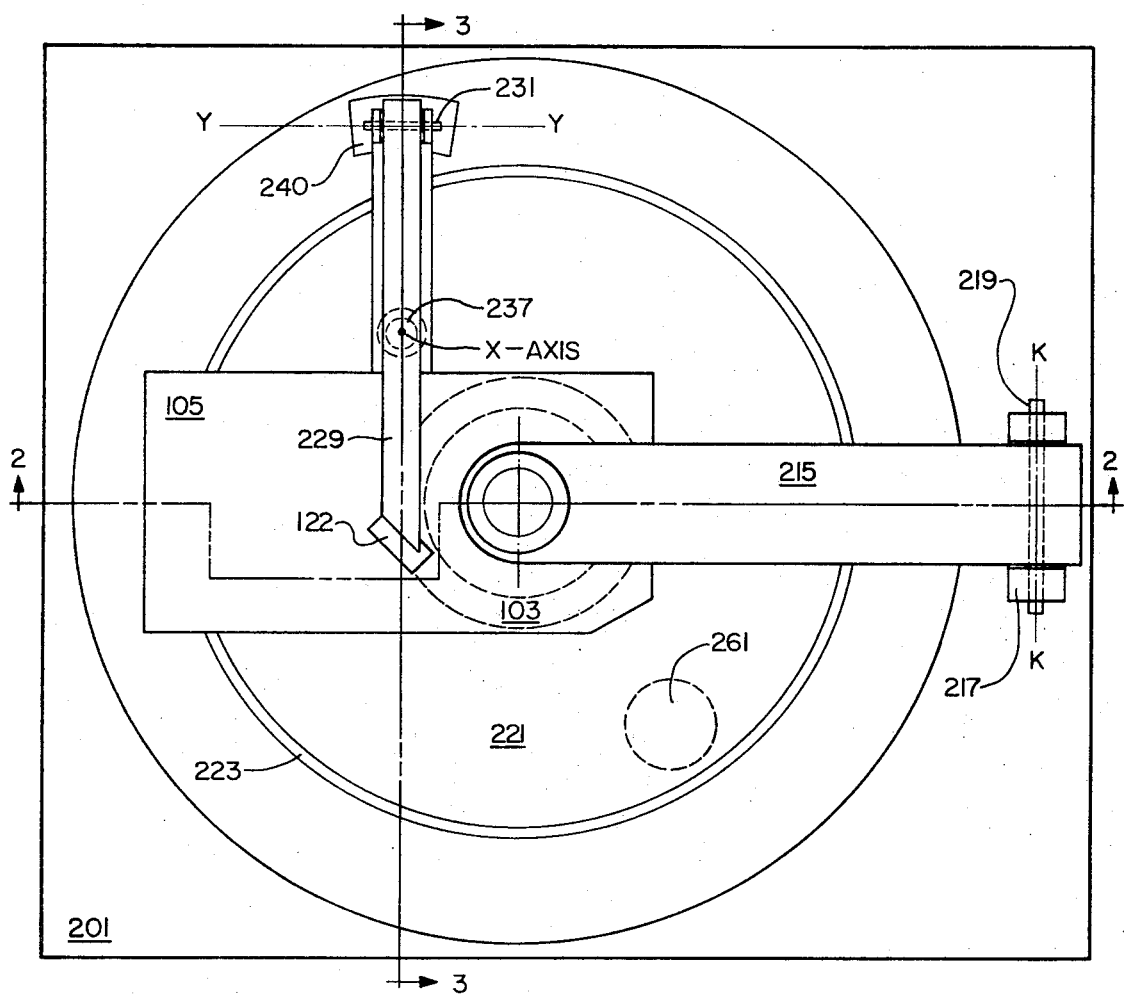

AUDIO AND AUDIOVISUAL APPARATUS WITH PINCERS-LIKE ROTATING ARM

FIELD OF INVENTION

This invention relates to audio, audiovisual and information-scanning devices and particularly to scanning of information from stationary audio or audiovisual records, for example, audiovisual data-record cards.

DESCRIPTION OF PRIOR ART

While picture and sound synchronization was successfully realized a long time ago in the movie industry, a practical method for obtaining the same result was not available, until a few years ago, in the photographic slides or transparencies field.

In his U.S. Pat. Nos. 3,302,520, 3,282,154 and 3,604,032 the inventor of the present invention taught a method of complete synchronization which consisted of directly and permanently associating a generous length of recorded sound (audio) information with each visually-projectable image or visual slide unit, in such a way that a properly designed projector, as described in his U.S. Pat. Nos. 3,122,053, 3,122,054 and 3,480,356, can simultaneously reproduce both audio and visual records of an audiovisual slide unit, individually or sequentially, without any special requirement as to synchronization, the latter following inevitably from the fact of integration of the two kinds of records upon a single audiovisual slide unit.

In the abovementioned patents the inventor of the present invention taught a form of audiovisual slides consisting of a projectable transparency, such as a projection diapositive, positive film, or the like, carried directly upon, or forming part of, a sound record of the spiral type, preferably, but not necessarily of the magnetic or phonographic type, adapted for ready reproduction by a special form of rotating transducer (for example, but not exclusively, a magnetic or phonographic pick up head). The audiovisual slides are employed with a special audiovisual apparatus that permits the audiovisual slides to be held stationary, while the pick up head is rotated around the optical projection beam, follows the spiral sound track, and thus senses and reproduces the sound information contained therein.

Audiovisual Slides and Audiovisual Apparatuses according to the teachings of the abovementioned patents are now the objects of commercial manufacture. But when magnetic sound tracks are employed, it is imperative that the best possible contact be made between the surface of the magnetic track and the pole-tip or shoe of the magnetic transducer, and the inventor of the present invention has taught methods of improving such surface-to-pole-tip contact in his U.S. Pat. Nos. 3,604,032 and 3,627,330. Nevertheless, there are some forms of audiovisual slides, especially when they are thin or very thin, for example data-record cards, which by their very nature, present substantial difficulties in this surface-to-pole-tip contact.

As to strictly audio alone, the prior art usually employed rotating information records while the transducers were pivotable about stationary (in relation to the apparatus) axial pivots, as in the case of the well-known record players. There have also been devices in which the transducer was movable, or rotatable, about a stationary record, but, as explained above, when an absolutely positive contact between the transducer and the record was necessary, substantial technical difficulties were encountered.

OBJECTS OF THE INVENTION:

It is, therefore, the object of this invention to provide a novel form of rotating transducer, assuring a very positive transducer-to-record contact, especially useful when the record has small, or very small, thickness, for example audio and audiovisual data-record cards.

It is a further object to provide an audiovisual apparatus particularly useful in the audiovisual reproduction of thin or very thin audio-visual slides, for example audiovisual data-record cards.

It is a further object to provide the means for obtaining positive, inexpensive and dependable transducer-guiding for the scanning of spiral information tracks.

It is a further object to provide means for the scanning of information from audiovisual records incorporating a combination of transducer-guiding grooves or transducer-guiding tracks and sound tracks.

Other objects of the invention will become evident from the ensuing description, illustrations and claims.

SUMMARY:

A transducer-carrying arm, generally shaped as a two-pronged yoke, straddling, and therefore gripping, in a pincers-like fashion, both sides of a stationary sound record, the arm being rotatable about the axis of the spiral information track of the record.

An audiovisual version of the above in which the arm rotates about the optical projection beam of the apparatus, the audiovisual slide employable in this device having a spiral sound track surrounding a projectable image.

BRIEF DESCRIPTION OF THE FIGURES:

FIG. 1 is a plan view of a typical embodiment of audiovisual apparatus according to the invention (with the cover and some parts removed to simplify the illustration and ensuing description).

FIG. 2 is a cross-sectional view taken along line 2—2 of FIG. 1.

DESCRIPTION OF THE PREFERRED EMBODIMENTS:

Alternative arrangements or embodiments of the present invention are particularly useful in the audiovisual field, while others are best suited to the audio or signals fields. Therefore, in the ensuing description, it must be understood that while a certain embodiment may be described as an audiovisual apparatus, an equivalent audio only device is usually possible, and vice-versa (by omitting, adding or altering some components, in an obvious, to those skilled in the art, fashion).

Figure 8:
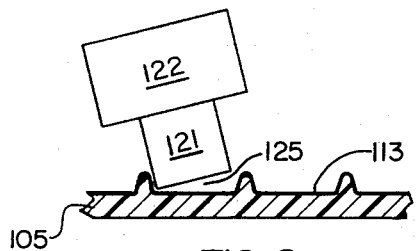
FIG. 8 illustrates an enlarged cross-sectional view of a pregrooved magnetic record and an elevation of a magnetic transducer improperly "seating" on the magnetic track.

In the abovementioned U.S. patents by the same inventor (which, in most cases, pertain to specifically audiovisual devices, but in which the difficulties or problems peculiar to their spiral tracks would be the same if their transparency portions did not exist), the sound tracks were of the phonographic, magnetic, optical etc. types. In the case of phonographic sound tracks the usual spiral phonographic groove was employed for guiding the point or needle of the phonographic transducer along the desired spiral path surrounding the transparency. When magnetic sound tracks were employed, the guidance of the electromagnetic transducer along this desired spiral path had to be obtained either from external to the audiovisual slide means, or by special pre-grooved magnetic sound tracks, for example, similar to those illustrated in FIG. 8. It is evident that when external means were employed, the centering of an audiovisual slide on the recording and reproduction apparatus was an extremely difficult problem, since the slightest misalignment would cause unacceptable sound deterioration. As it is also explained in U.S. Pat. No. 3,604,032 by the same inventor, a perfect contact is imperative between the surface of the sound track and the pole-tip, or shoe, of the electromagnetic transducer. In order to obtain this perfect contact it was found very useful to back-up the magnetic oxide layer with a resilient material, (for example, rubberfoam) so that differential areas or segments of the sound track may "float" under the pressure of the transducer's shoe. As long as the audiovisual slides are of a fairly thick cross-section, the use of such resilient backing is possible. However, when very thin slides are employed, such as audiovisual data-record cards, the interposition of such a backing is very difficult or impossible, and one must rely on the flexibility of the card itself to ensure a perfect sound track to pole-tip contact. In addition, in pre-grooved magnetic tracks the wall separating adjoining sound tracks has a substantial height, and this adds up thickness at one portion of the card, and may cause problems in automatic sorting machines. FIG. 8 illustrates in a somewhat exaggerated fashion what happens when the pole-shoe 121 of a magnetic transducer 122 does not make a perfect contact with the surface of the sound track 113. In this FIG. 8, only the left corner of the shoe 121 touches the sound track 113, and thus an unacceptable void, here designated by numeral 125, remains between the sound track and the shoe of the transducer. It must be understood that even if the shoe of the transducer is properly aligned, it is almost certain that unevenesses will exist in various points along the sound track 113. It might be suggested that a gimbal suspension of the transducer might solve the problem but this is not so in view of the very small size and geometry of the shoe of the transducer.

In his co-pending patent application No. 15,738, filed concurrently herewith, the inventor of the present invention teaches various arrangements, configurations and forms of audiovisual slides and audiovisual data-record cards, which make a substantial contribution to the field by providing:

a. Dependable, economical and practical transducer-guiding means on each and every audiovisual slide and data-record card.

b. The elimination of the additional height of the spiral guiding wall, as is required in pregrooved magnetic tracks of the prior art, thus ensuring uniform thickness throughout the audiovisual slide or audiovisual data-record card.

c. Means for ensuring positive transducer-shoe to sound-track contact.

The above three principal contributions and some secondary ones are made possible by the teachings of the abovementioned co-pending patent application, pertaining to audiovisual slides, while the present invention teaches devices and apparatuses employing these special audiovisual records. But the apparatuses of the present invention may also employ other types of records, for example, audio records. Therefore, the principles of the invention will be described below in connection with a few typical embodiments thereof:

EMBODIMENT I

Figure 11:
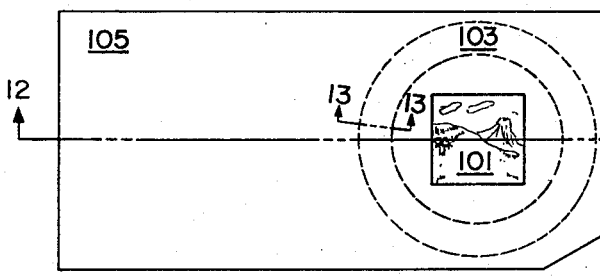
FIG. 11 is a plan view of one of the forms of audiovisual slides (in this case a data-record card) which may be used in the apparatus built according to the teachings of this invention.
Figure 12:
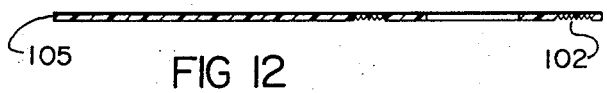
FIG. 12 is a cross-sectional view along line 12—12 of FIG. 11.

Audiovisual Apparatus for use with records having a spiral information track on one side and a guiding groove on another side FIGS. 11 and 12 illustrate a typical form of audiovisual slide which may be used in the apparatus of the invention. Although the shape of the slide, as illustrated, is particularly useful when the slide is a data-record card, other shapes are, of course, possible. This slide 105 carries an image 101 and at least its annular region 103 is coated, or is covered, with a magnetizable material, in the known "magnetic tape" fashion. On its opposite surface, and directly beneath the annular ring region 103, the card is formed with a spiral groove 102, somewhat resembling that of a phonographic record, but *without the usual sound modulation*.

Referring now to FIGS. 1, 2, 3 and 13, this audiovisual slide 105 is placed in the apparatus, so that it is held firmly and stationary about its image portion only. Holes or markings on the card 105 (not shown in FIG. 11) may be very useful for locating, in a positive way, the slide or card 105 on the apparatus.

The apparatus includes the usual base or frame 201, on which a hollow turntable spindle 203 is firmly secured. As it can be seen, this hollow turntable spindle 203 contains a condensing lens system, for example lenses 205 and 207, which collimate the rays from a projection lamp 209 onto image 101 of the audiovisual slide 105. Turntable 211 can freely rotate about the hollow spindle 203, driven by motor means, in the usual phonographic fashion.

As previously stated, the audiovisual slide is held firmly about its image portion, and a convenient way for doing so is the following arrangement: The hollow spindle 203 protrudes over the surface of the turntable. The barrel 213 of the projection lens cell 221 is mounted on member 215, which in turn is pivotally secured by means of pin 219 to member 217, which, in turn, is secured to base 201, member 215 is urged in the direction of arrow A, for example by means of its own weight, or by spring 224, and thus, the slide 105 can be firmly held between the hollow turntable spindle 203 and the barrel 213. If this slide 105 is thin and flexible, as is usually the case of data-record cards, it may also be supported by the flat surface of the turntable, or, in order to reduce friction, the turntable may be formed with one or more protruding (or embossed) rings, for example ring 223, which further supports the slide 105.

Figure 13:
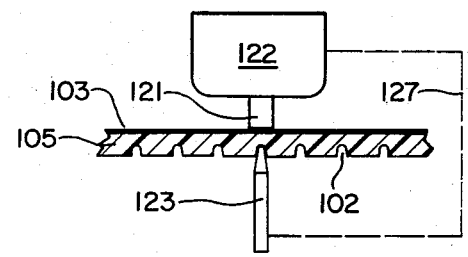
FIG. 13 is an enlarged elevation of still another arrangement of the transducer and stylus elements of the pincers-like arm of the invention gripping a segment of an audiovisual slide, the pincers-like arm shown in a simplified diagrammatic way, and the slide segment corresponding to a sectional view taken along line 13—13 of FIG. 11.

Since the audiovisual slide of FIGS. 11 and 13 has a guiding groove 102 on one side and a spiral sound track on its other side, an interesting arm of novel construction is employed in the recording and reproduction apparatus, some of its novel features being:

a. It is not stationary, in the usual phonographic fashion, but is *mounted on the rotating turntable*, while the record remains stationary.
b. Furthermore, it rotates around the optical projection beam.
c. Furthermore, it consists, principally, of a U-shaped member, somewhat resembling a two-pronged yoke, having a transducer mounted on one prong, and a guiding stylus on the other, the transducer's pole-tip and the stylus facing one another, and thus gripping in a pincers-like fashion the audiovisual slide.
d. Furthermore, one of its prongs may (optionally) be under the turntable, while its other prong may be over it. Thus, always referring to FIGS. 1, 2, 3 and 13, it can be seen that the U-shaped, two-pronged arm of the invention, may essentially consist of two members, L-shaped member 225, and member 229, pivotally secured to one another, in a pincers-like fashion, for example by means of pivot means 231, and pulled against one another by spring means, for example spring 232. One of the abovementioned two arm members, for example member 225, may be pivotally mounted on the lower part of the turntable, for example, member 225 may be formed with, or may be secured to, bearing means 235 which are journalled around pivot 237. Pivot 237 may be riveted to, or otherwise secured to, the underside of turntable 211, in such a fashion that its longitudinal axis X—X is substantially parallel to the optical (and turntable) axis Z—Z. On the other hand the lengthwise axis Y—Y of the previously described pivot 231 is substantially perpendicular to the X—X axis, and thus the pincers-like arm of the invention has the usual two degrees of freedom, i.e. about the mutually perpendicular axis Y—Y and X—X, but can also freely rotate about the turntable axis Z—Z. On one of the two members of the pincers-like arm, say member 229, the transducer 122 is mounted, while on the other member, say member 225, a stylus (or needle) 123 is firmly secured so that the point of the stylus 123 faces the pole-tip of the transducer. In this fashion the audiovisual slide 105 is "-pinched" between the transducer pole-tip 121 and the stylus 123 (see FIG. 13), and while the stylus 123 rides in, and follows, the spiral groove of the slide, the transducer is forced to follow a spiral path on the other side of the slide and thus record or reproduce a sound track.

The advantages of this arrangement are great. The pincers-like action permits perfect transducer-to-slide contact, even if the slide 105 should be slightly bent or has small unevenesses on its surface. The magnetic side of the card can be flat and smooth since it is free of any transducer-guiding grooves, separating walls, etc. Even small misalignment of the transducer can be allowed, since the needle 123 presses the flexible slide 105 against the pole-tip or shoe 122 of the transducer.

Since the transducer rotates, its output leads (not shown), may be connected to the usual slip rings 238 and brushes 239 (see FIG. 2).

Figure 3:
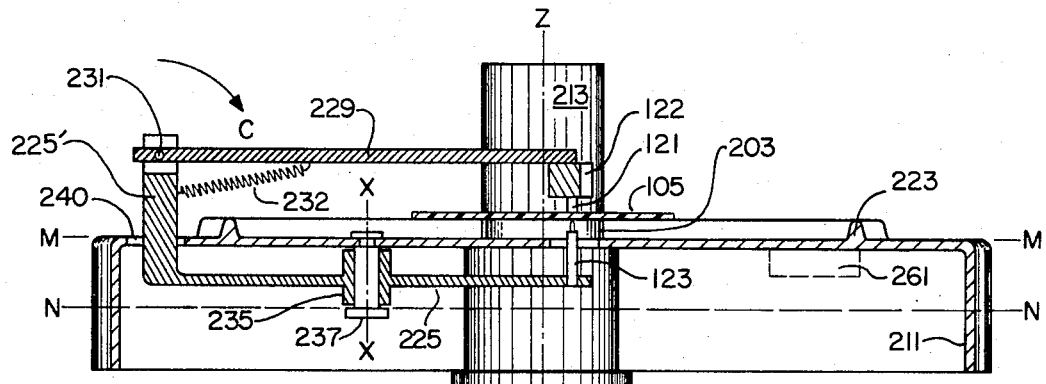
FIG. 3 is a cross-sectional view, corresponding to a sectional view along line 3—3 of FIG. 1, with some parts removed or not shown to simplify the illustration.

In the arrangement illustrated in FIGS. 1, 2 and 3, one member of the arm is beneath the turntable surface M—M (see FIG. 3) and the other above, and therefore, the turntable must have appropriate cut-outs or holes, for example 240 and another hole through which the stylus 123 may pass. But, of course, the entire arm could be on one side of the turntable, in which case the surface of the turntable could be on plane N—N, FIG. 3. Such an arrangement is specifically illustrated in FIG. 4 although the arm has a somewhat different configuration, as it will be described later.

Figure 5:
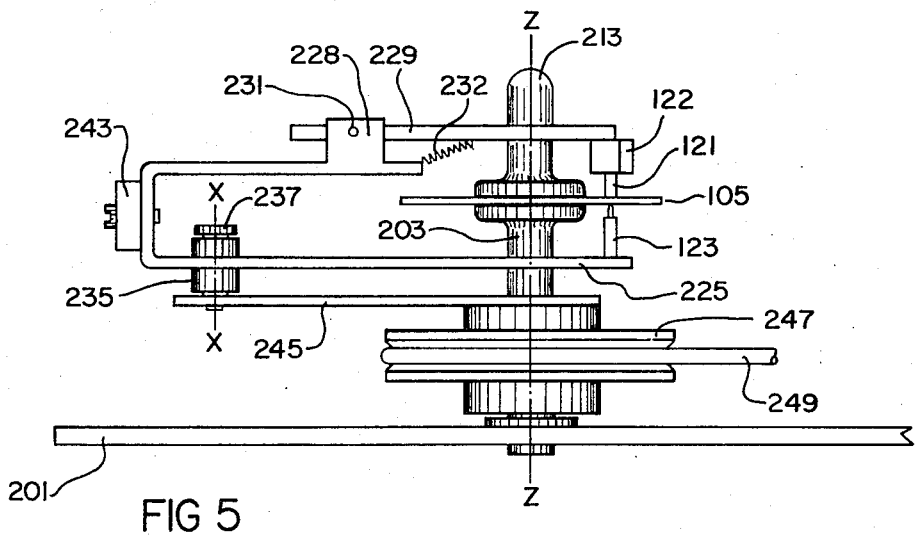
FIG. 5 is a side elevation of still another embodiment of the invention.

In order to minimize problems caused by centrifugal force, gravity, etc., it is usually prudent to balance the arm about its X—X axis, and for this purpose member 225 may have its end designated by numeral 225' built in a heavier section, to act as a counterweight, or a separate counterweight may be attached thereto (as illustrated by counterweight 243 in the equivalent case of the arm of FIG. 5).

It may also be useful to add a weight on the turntable to counterbalance the weight of the arm and other components. Such optional weight is shown with dotted lines and designated by numeral 261 in FIGS. 1 and 3.

Figure 4:
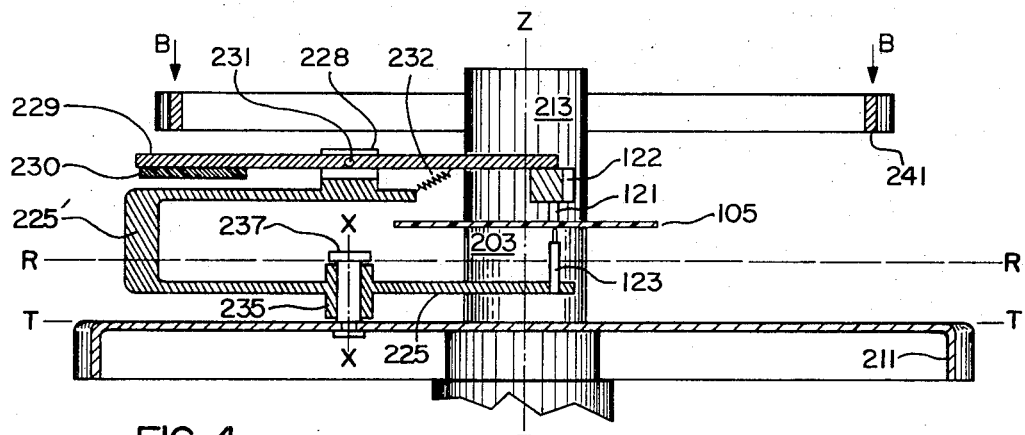
FIG. 4 is a view similar to that of FIG. 3 of a somewhat different embodiment of the invention.

The pincers-like principle of the arm can be carried out by physically different embodiments, and as an example, variations of arm configurations have been illustrated in FIGS. 4 and 5.

FIG. 4 illustrates an arm, similar to that of FIGS. 1, 2 and 3, but having member 225 shaped in a fashion that allows the axis X—X of pivot 237 to intersect the axis of pivot means 231. In this arrangement, it is sometimes useful to extend member 229 beyond its pivot 231, and secure to it a counterweight 230. The additional length thus obtained may be utilized to lift the transducer 122 away from the surface of the slide 105, in order to facilitate the insertion and removal of such a slide. For example, ring 241 may be moved in the direction of arrows B, contact the free end of member 229 and thereby open-up the pincers-like arm. While FIG. 4 illustrates an arm pivoting above the turntable 211, i.e. above its surface T—T, it is evidently possible to pivot such arm below the turntable, say, on plane R—R, in a manner equivalent to that illustrated in FIG. 3

EMBODIMENT II

Similar to Embodiment I but with solid turntable spindle

It is evident that the arrangement of the Embodiment I, is equally useful when audio and/or signals only are to be recorded or reproduced. In this case, the transducer need not rotate about an optical projection beam and therefore the spindle need not necessarily be hollow, nor of substantial diameter. In all other respects, all the advantages of guiding magnetic transducers along a spiral path, as previously described in Embodiment I, still exist.

EMBODIMENT III

Pincers-like rotating arm without turntable

In order to obtain good information-scanning quality from a moving transducer, it is essential that the transducer moves with a smooth, vibration-free motion. It is, therefore, convenient to mount the transducer on a rotating turntable of substantial weight to impart the desired rotational momentum. This was the principal reason for using turntables in Embodiments I and II. (The turntable also provides proper support to flexible audiovisual slides).

Nevertheless, the principles of both Embodiments I and II can equally well be carried out in an arrangement where a pincers-like arm rotates directly about a spindle (whether hollow spindle or solid spindle), without the benefit of a turntable and such an arrangement is illustrated in FIG. 5. Here the member 225 is pivotally mounted directly on member 245, attached to pulley 247, journalled about the turntable spindle 203 and driven by belt 249. Other driving means are also possible and well known in the art.

EMBODIMENT IV

Alternative arrangements

Figure 6:
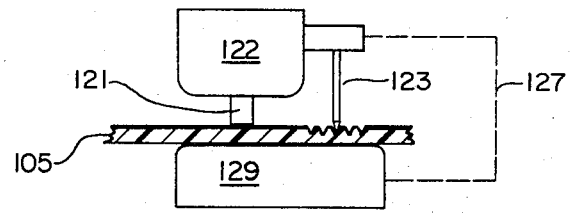
FIGS. 6 and 7 are enlarged elevations of alternative arrangements of the transducer and pad elements of the pincers-like arms gripping a segment of an audiovisual slide, the pincers-like arms shown in a simplified diagrammatic way.

The pincers-like rotating arm principle, with a hollow or solid spindle, is applicable with several types of transducers in various configurations and for illustrative purposes a few more will be described below:

FIG. 6 illustrates the case where the guiding groove is on the same side of the slide as the magnetic track, and in such a case, both the transducer 122 and the needle 123 are mounted on one prong of the arm, while a small supporting pad 129 is mounted on the other prong. This pad may be of highly polished metal or plastic, for example, teflon or the like.

Figure 7:
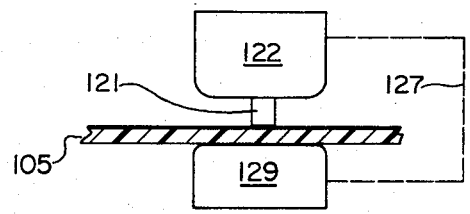

It is possible to provide spiral guiding means on a magnetic record, other than of the grooved type, as described in the abovementioned copending patent application by the same inventor. Again, a pincers-like rotating arm arrangement is very useful, for the above-enumerated reasons, and FIG. 7 illustrates such an arrangement. The transducer 122 is secured on one prong of the arm, while a small pad 129 made of metal or plastic is mounted on the other.

Figure 9:
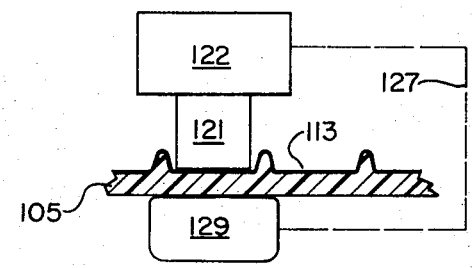
FIG. 9 is a view similar to that of FIG. 8, but illustrating a properly seated transducer, the proper seating being made possible by the pincers-like arm of the invention (shown diagrammatically).

FIG. 8 illustrates what happens when the pole-tip 121 of a magnetic transducer does not make a perfect contact with the magnetic surface 113 of the track. Here the enlarged cross-section of a pregrooved magnetic track has been illustrated, and it can be seen that a void 125 is caused by improper contact. This void can be eliminated by the pincers-like arm of the invention, and FIG. 9 illustrates such an arrangement, where the transducer 122 is mounted on one prong of the pincers-like arm, while a small pad 129, made again of metal or plastic, is mounted on the other prong.

Figure 10:
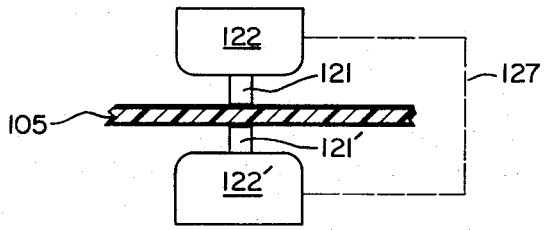
FIG. 10 is again a view similar to that of FIGS. 6 and 7, except that two transducers, facing one another, are attached on the U-shaped, pincers-like, arm of the invention, the arm again shown diagrammatically.

FIG. 10 illustrates another interesting arrangement. Both surfaces of the slide 105 are magnetizable, and while one carries the spiral sound track, the other surface may carry a spiral magnetic guiding track directly underneath the sound track. In this case, two transducers 122 and 122' are mounted, one on each prong of the two-pronged arm, with their pole-tips 121 and 121' facing one another, as illustrated in this FIG. 10.

REMARKS AND COMMENTS:

As it has been generally described and illustrated the transducer is mounted on the upper prong of the arm and the stylus or the pad in the lower. It is evident that the opposite will equally well work, and indeed would be preferable in some cases.

Any arm may be mounted wholly above, or wholly below, or partly above and partly below the turntable. As a matter of fact it is not entirely correct to use the terms "above" and "below", since the turntable can equally well be facing up or down, with the arm "supported" or "hanging" from it.

Furthermore, when the arm and turntable (if a turntable is used at all) are counterbalanced, the plane of rotation may be horizantal, vertical or at any desired angle and inclination, as has been described and explained in the above identified patents by the same inventor.

And again, which "jaw" or prong of the arm is pivotally supported and which opens up, or lifts up, for the insertion and removal of audiovisual slides is immaterial, in spite of what has been shown in the Figures for illustrative purposes.

It has been stated that the image 101 of the slides 105 is a projectable transparency, but it could, of course, also be an image for epidiascopic projection, in which case the optical elements in the optical path Z—Z will be modified as required. In the final analysis, other than purely optical images can be employed on the slides, in which case, the optical elements in the optical path Z—Z of the apparatus will be modified in the appropriate manner, within the spirit of the invention.

FIGS. 11 and 12 illustrate what is essentially an audiovisual data-record card, and the devices of this invention are particularly suited for use with such cards. Nevertheless, it is obvious that the apparatuses of the invention are equally well suited for use with any appropriate audio-visual slide (or audio only), including but not limited to data record cards, discs, strips and audiovisual or audio slides of thick or thin cross-section, whether substantially rectangular, circular, or in the form of a strip, etc.

Specific reference to magnetic tracks and magnetic or electromagnetic transducers has been made in the description and illustrations, but other forms of tracks and transducers are evidently possible, within the spirit and teachings of the invention, for example electrostatic, etc. tracks, and therefore such other forms of tracks and transducers are clearly intended to be included in the present invention.

Figure 14:
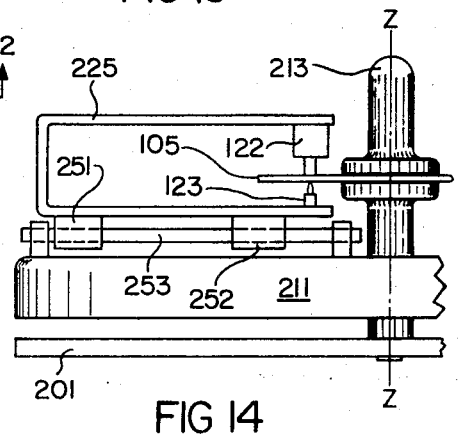
FIG. 14 is a fragmentary elevation of an embodiment of the invention.

While a number of specific apparatuses and rotating, pincers-like arms, transducers, etc. have been described and illustrated, and a number of specific embodiments disclosed, it will be understood that several modifications and variations within the spirit of the invention are possible, for example, the rotating pincers-like arms of the invention need not be pivotally mounted about axis X—X as has been shown on FIGS. 1 through 5 for illustrative purposes, but instead, the rotating pincers-like arm principle can equally well be carried out by other transducer-supporting arms or arrangements, for example, "pantographic arms", or "radial arms". "Radial arm" arrangements are of particular importance and significance because while they have only found limited uses and applications in the phonographic field (for reasons well known in the art), their limitations and problems are in most cases overcome by the pincers-like arrangements of this invention, which permits positive and reliable "gripping" of the records and therefore excellent tracking. Such radial arms may be used in all the embodiments of the invention, with or without turntables, with hollow or solid spindles and in general, everything stated or described above may equally well apply to such radial arms, and as an example, FIG. 14 illustrates one of the several possible configurations such arms may take. FIG. 14 illustrates the U-shaped, two-pronged, arm 225 of the invention, slidably supported on turntable 211, for example, by means of sliding bearings 251 and 252 secured to the arm 225. These bearings 251 and 252 slide over shaft 253 whose longitudinal axis is substantially parallel to a turntable radius. The shaft 253 is secured to the turntable 211, or if no turntable is used, it is secured to driving means which rotate it about the axis Z—Z. It must be noted that two shafts 253, parallel to one another may be used, or alternatively the shaft 253 may have other than a round cross-section, in order to prevent the pincers-like arm 225 from "tipping over". On the other hand, in some cases, the use of only one cylindrical shaft 253 may have the advantage that the transducer's pole-tip may align itself on the record's surface, thus improving the "seating" of the pole-tip on the sound track.

This FIG. 14 further illustrates how the U-shaped, two-pronged, arm of the invention, need not have its two prongs secured to one another by pin means, as illustrated by pin 231 in FIGS. 1 through 5, but the U-shaped arms of the invention may be built with (or include parts of) sufficient flexibility or elasticity to insure the desired pincers-like effect, and this simplified version of the pincers-like arm is equally well applicable in all the embodiments, devices and illustrations of the invention.

What is claimed is:

1. Audiovisual apparatus for use with a substantially flat audiovisual information record carrying a visually reproducible image surrounded by a stationary spiral information track coaxial to an also stationary spiral transducer-guiding track, said apparatus comprising:
    a. a stationary member fixedly supporting said record on said apparatus solely from points lying within the disc-shaped segment of said record encircled by said information track said member allowing radiation to pass therethrough.
    b. electrooptical means generating a radiation beam passing through said stationary member and directed onto said image, thus producing imaging rays for the visual reproduction of said image,
    c. information-scanning means rotably mounted around said member for rotation about said member to scan said spiral information track.

2. Apparatus according to claim 1 in which said information-scanning means comprise: a rotatable arm, having generally the shape of a two-pronged yoke which straddles and grips, in piners-like fashion, both sides of said record through gripping means secured to both prongs of said yoke, said gripping means substantially facing one another; said gripping means including at least one transducer and transducer-guiding means; said arm being rotatably mounted on said apparatus for rotation about said member, said arm having its axis of rotation substantially coaxial to the axis of said spiral information track, said transducer engaging in an information-scanning relationship said information track and being guided by said transducer-guiding means which engage and follow said spiral transducer-guiding track.

3. Apparatus according to claim 2 in which each of the two prongs of said arm carries a transducer, their information-scanning ends substantially facing one another.

4. Apparatus according to claim 2 in which said transducer-guiding means is a stylus secured to one of the two prongs of said arm while said transducer is carried on the other prong; said stylus engaging and following a spiral groove on the record, said spiral groove constituting said transducer-guiding track.

5. Apparatus according to claim 2 in which one of the two prongs of said arm carries said transducer and the other prong carries a small pad facing the information-scanning end of said transducer.

6. Apparatus according to claim 5, in which the transducer-carrying prong also carries a stylus pointing substantially towards said small pad, said stylus engaging and following a spiral groove on said record, said spiral groove constituting said transducer-guiding track.

7. Apparatus according to claim 2, in which said arm is secured to a rotating member rotatable about said axis of rotation.

8. Apparatus according to claim 7, in which said arm is secured to said rotating member through pivot means whose axis is substantially parallel to said axis of rotation.

9. Apparatus according to claim 8, in which said arm is substantially balanced about said pivot means.

10. Apparatus according to claim 7, in which said rotating member is balanced about said axis of rotation.

11. Apparatus according to claim 7, in which at least a part of said rotating member is further supporting said record.

12. Apparatus according to claim 7, in which said rotating member is a turntable.

13. Apparatus according to claim 7, in which substantially all of said arm lies on one side of said rotating member.

14. Apparatus according to claim 7, in which part of said arm lies on one side and part lies on the other side of said rotating member.

15. Apparatus according to claim 14, in which said rotating member is formed with an aperture through which said gripping means of said arm may freely pass.

16. Apparatus according to claim 14, in which said rotating member is formed with an opening through which said yoke may freely pass.

17. Apparatus according to claim 7, in which said rotating member is formed with at least one annular ring supporting said record.

18. Apparatus according to claim 7, in which said arm is secured to said rotating member through sliding means whose lengthwise axis defines, as it rotates, a plane substantially perpendicular to said axis of rotation.

19. Apparatus according to claim 2, in which the two prongs of said arm are urged against one another by spring means.

20. Apparatus according to claim 2, in which the two prongs of said arm are hingedly secured to one another by hinge means, the plane defined by the rotating axis of said hinge means being substantially perpendicular to said axis of rotation.

21. Apparatus according to claim 2, in which signal-commutation means are provided for the transfer of electrical signals from said rotating transducer.

22. Apparatus according to claim 21, in which said signal-commutation means include slip-ring and brush means.

23. Apparatus according to claim 2, in which said transducer is a magnetic transducer.

24. Apparatus according to claim 2, including driving means to impart the rotating motion to said rotatable arm.

25. Apparatus according to claim 2, including opening means engageable with said two-prong yoke to open-up said gripping means for the insertion and removal of said record.

26. Apparatus according to claim 25, in which said opening means include an annular ring moveable towards and away from the plane of rotation of said arm, and engageable with at least one of said prongs.

* * * * *